Sept. 26, 1961 M. J. LAFAURIE 3,001,704
TIME DELAY PACKING COUNTER
Filed Dec. 30, 1957 2 Sheets-Sheet 1

INVENTOR
Michel J. Lafaurie

BY Geoffrey Knight
ATTORNEY

Sept. 26, 1961     M. J. LAFAURIE     3,001,704
TIME DELAY PACKING COUNTER
Filed Dec. 30, 1957     2 Sheets-Sheet 2

TIMING CHART

INVENTOR
Michel J. Lafaurie

BY Geoffrey Knight
ATTORNEY

3,001,704
TIME DELAY PACKING COUNTER
Michel J. Lafaurie, Redwood City, Calif., assignor to International Business Machines Corporation, New York, N.Y., a corporation of New York
Filed Dec. 30, 1957, Ser. No. 705,878
1 Claim. (Cl. 235—98)

This invention relates to a counter and more particularly to a device for counting packing cases which will deter packers from fraudulently counting packing cases not actually filled.

When packing cases to be filled are manipulated by hand into and out of the position in which they are to be filled and when the packing cases are to be counted by a device of this kind, it is possible to make a fraudulent count by actuating the counter operating lever without actually filling the packing case, unless suitable precautions are taken.

It is therefore an object of this invention to provide a counting device for packing cases of the kind described having means to prevent the fraudulent operation mentioned above.

It is a further object of this invention to provide a device of the kind described in which the operation of the counter is blocked for a sufficient length of time to enable a packing case to be filled.

Other objects of the invention will be pointed out in the following description and claims and illustrated in the accompanying drawings, which disclose, by way of example, the principle of the invention and the best mode which has been contemplated of applying that principle.

In one type of packing installation packing cases to be filled are manually placed on the packing stand, are then manually filled, and then removed manually to a conveyor or a dolly. Quite often the person packing the packing cases is paid according to the number of cases he can pack. Rather than allow the packer to keep a count himself or delegate another person to count the packed cases it has been found that an automatic counter which will keep an accurate count of the cases packed is cheaper and will speed up the counting operation. Heretofore there was used a countnig device comprising a simple spring loaded plunger attached to the packing stand, which plunger was depressed when the case to be packed was placed on the packing stand, the depression of the spring loaded plunger closing a contact to a counter, and a count of one being registered whenever a packing case to be packed was placed in the packing stand. The packers soon learned that a count of one was registered every time a packing case was placed on the packing stand, so some of the packers would life the packing cases on and off the packing stand without filling a packing case for each time they lifted the packing case on the packing stand. This procedure on the part of some of the packers produced erroneous counts and resulted in the dishonest packers receiving credit for packing more packing cases than they actually packed.

To solve this problem it has been determined what the minimum times are in which different packing operations may be completed and there has been placed between the spring loaded plunger and the counter a time delay circuit which does not allow a count to be taken until the case to be packed has remained on the packing stand for the minimum time required for that particular packing operation.

If the packing case is removed before the minimum time required for the completion of the packing operation has passed, no count is taken. The time delay circuit is positioned to allow a count to be registered by the counter only after the packing case has remained on the packing stand for the minimum time required for the completion of that particular packing operation.

In a preferred embodiment of the invention the time delay circuit includes timing motor operated delay means activated by the spring loaded plunger. The timing means intermittently controls the counter so the operation of the counter is necessarily delayed for a predetermined length of time after the packing case is placed in a packing position.

Figure 1:
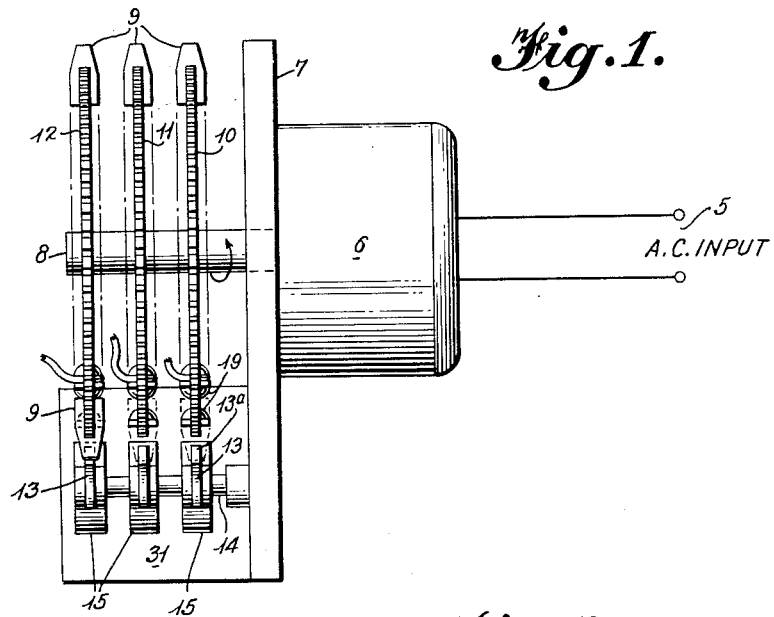
FIG. 1 is a side elevation of a cycling device used in one embodiment of this invention.
Figure 2:
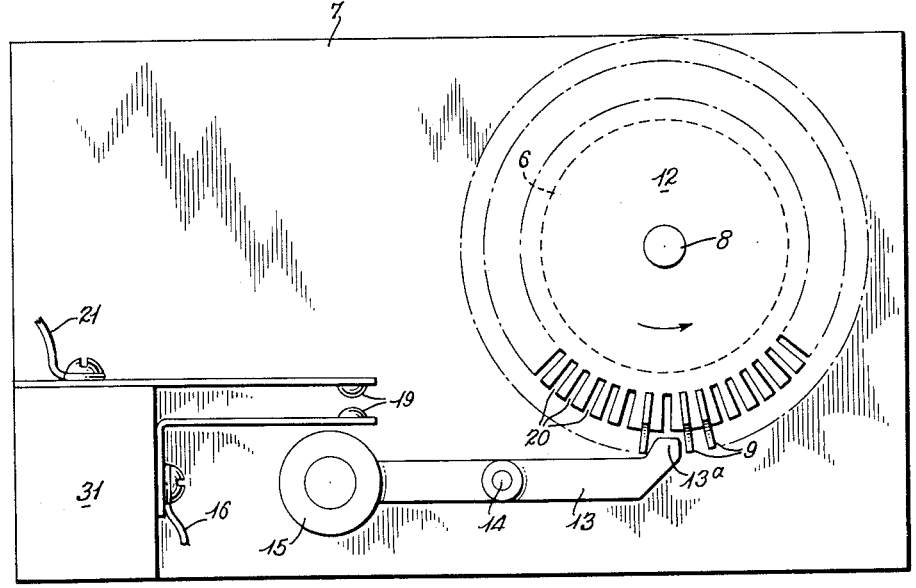
FIG. 2 is a front elevation of the device shown in FIG. 1.

Referring first to FIGS. 1 and 2 for a detailed description of one embodiment of the invention, the counting device comprises a base plate 7 to the back of which is attached a synchronous motor 6 with an output shaft 8 extending through the base plate. The output shaft 8 has three circular program discs 10–12 rigidly attached thereto, each of the program discs 10–12 having sixty slots 20 about the circumference of the program discs, the sixty slots 20 being adapted to receive contact clips 9. A contact control block assembly 31 is attached to the front side of the base plate and consists of three individual sets of contacts 19, contact controls 13–15 and leads 16 and 21, one set of contacts 19, contact controls 13–15 and leads 16 and 21, for each program disc 10–12. The lever arm 13 is pivotally mounted on pivot 14, with the tip 13a of lever arm 13 in close proximity to the periphery of the program disc 12, and when a contact clip 9 in a slot 20 on the circumference of the program disc 12 meets the tip of the lever arm it will rock the lever arm 13 in a clockwise direction about its pivot to cause the opposite end 15 of the lever arm to meet and close the contact points 19. The contact points 19 will then remain closed until the next slot 20 on the program disc 12 is reached, then if there is another contact clip, the contact points 19 will remain closed, but if there is no contact clip the contact points 19 will open.

The synchronous motor 6 is selected to operate at the desired rate of speed, which is the speed at which the program discs 10–12 are to be rotated. The program discs 10–12 have been described as having sixty slots on their circumference in which can be put contact clips 9, and the contact clips 9 when passing lever arm 13 close contact points 19 until the next slot reaches the contact arm. As our standard of time puts sixty seconds to a minute, we can operate the synchronous motor at a speed of one revolution per minute and the presence of one contact clip will close contact points 19 for one second as the program discs rotate. A sequence of fifteen contact clips will therefore close contact points 19 for fifteen seconds.

Figure 3:
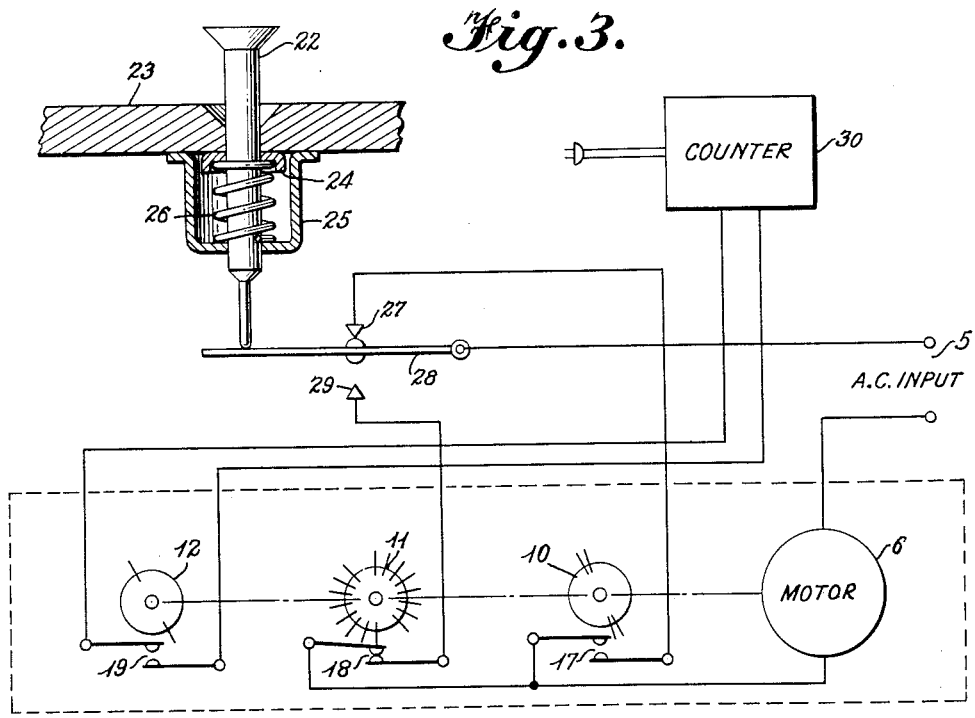
FIG. 3 is a schematic view showing a wiring diagram of one embodiment of the invention using the cycling device shown in FIGS. 1 and 2.
Figure 4:
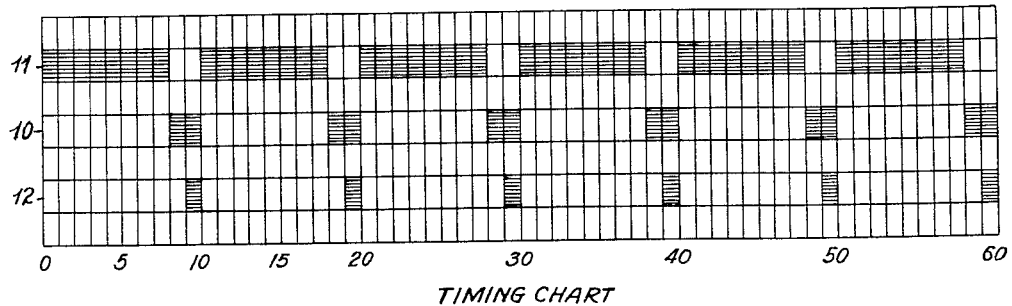
FIG. 4 is a timing chart of the embodiment of the invention shown in FIG. 3.

FIG. 3 shows the counting device attached to the packing stand 23 on which the packing cases are positioned to be filled. Plunger 22 is forced down when a packing case is placed on the packing stand, overcoming the force of a spring 26 placed between a cup 25 affixed to the packing stand and a flange 24 affixed to the plunger. Transfer point 28 is a spring contact with points 27 and 28 normally closed; transfer point 28 is tranferred to point 29 when plunger 22 is depressed. The counter 30 is a counter which registers a count of one each time the circuit to the counter is opened and closed. FIG. 4 shows the location of the contact clips on each program disc, and as each contact clip represents the closing of each contact for one second, FIG. 4 also shows the length of time contacts 17, 18 and 19 are closed as the program discs rotate.

The circuit is shown in its normal position when no packing case is on the packing stand. The program discs are positioned so the contact clip in slot one of program disc 11 closes contact points 18. Contact points 28 and 29 are normally open so there is no circuit to the synchronous motor 6.

When the packing case is placed on the packing stand, transfer point 28 transfers and closes points 28 and 29 completing a circuit from the A.C. power source 5, to the contact points 28 and 29 (now closed), to the contact points 18 (now closed), to the motor 6, and back to the A.C. power source, operating the motor. There are contact clips in the first eight slots of program disc 11, therefore contact points 18 remain closed for eight seconds while the program discs rotate. Note that if the packing case is removed before eight seconds has elapsed transfer point 28 transfers, breaking the circuit to the motor. At the end of eight seconds contact points 18 open, breaking the circuit to the motor and the program discs are positioned in the ninth position. There is a contact clip in the ninth slot of program disc 10 which closes contact points 17. When the packing case is removed from the packing stand transfer point 28 transfers to complete a circuit from the A.C. power source, to contact points 27 and 28 (now closed), to contact points 17 (now closed), to the motor, and back to the A.C. power source, operating the motor. There are contact clips in slots nine and ten of program disc 10, therefore contact 17 remains closed for two seconds while the program discs rotate.

Program disc 12 rotates with the other program discs and a contact clip in the tenth slot of this disc closes contact points 19 and allows it to open one second later when the disc reaches position 11. This registers a count of one in the counter 30 after the packing case has been removed from the packing stand.

What has now been accomplished is that the packing case has been required to remain on the packing stand for the minimum time required for a filling operation before a count could be registered.

To keep an accurate count of packing cases filled, simple precautions must be taken which are well known in the packing art. Each packer must place a slip of paper in each packing case filled so if an improperly filled packing case is found it can be determined which packer failed to complete his packing operation. In conjunction with such a packing installation there is also a counter to give the total number of packing cases coming off the conveyor or dollies, and this total is compared with the sum of the individual counts to provide a general indication of whether any fraud is being practiced.

After a count of one is registered in the counter the program discs are positioned in the eleventh position, as stated, and the circuit is positioned for another cycle leading to a count when another packing case is placed on the packing stand for filling. Notice that the arrangement of the contact clips on the program discs is such that the two motor circuits are closed alternatively to cause the motor to operate, the contact clips on the program discs being so positioned that either one or the other of the motor circuits is always closed by the placement or removal of a packing case.

The times given and the location of the contact clips in the program discs are obviously a matter of choice dependent upon the minimum time required for packing a packing case or the desired time delay before a count may be taken. The synchronous motor may be operated at various speeds and combined with different locations of the contact clips on the program discs to provide any time delay desired. The number of slots in each program disc was chosen to correspond with a speed of one revolution per minute.

By means of this invention the possibility of fraud in the counting of packing cases being filled is much reduced and such fraud is easier to detect. The packer cannot register a count in less than the minimum time required to fill the packing case. If the packer removes the packing case before the minimum time the circuit to the motor is broken and no count is taken. The safeguards which are well known in the art will prevent the incomplete filling or no filling at all.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

In a device for counting packing cases to be filled, a timing motor, a circuit for said motor including a source of power and first and second parallel branch circuits, detector means including an operating element adapted to be moved to an operated position by placement of a packing case in a filling station and to be moved to a non-operated position upon removal of the packing case from the filling station, said detector means including switching means in said first branch circuit closed when said operating element is in its operated position and switching means in said second branch circuit closed when said operating element is in its non-operated position, first timing switch means controlling said first branch circuit, second timing switch means controlling said second branch circuit, timing means operated by said motor and including means to close said first and second timing switch means during alternative periods of operation of said timing means, the period of time during which said first timing switch means is closed by said timing means being substantially the same as the minimum time required to fill a packing case, a counter, and means activated by said motor during the operation of said motor by the supply of power thereto through one of said branch circuits to operate said counter.

References Cited in the file of this patent
UNITED STATES PATENTS

| | | |
|---|---|---|
| 1,468,275 | Briggs | Sept. 18, 1923 |
| 2,850,241 | Kilborn | Sept. 2, 1958 |